(12) United States Patent
Klügl et al.

(10) Patent No.: US 7,202,441 B2
(45) Date of Patent: Apr. 10, 2007

(54) METHOD FOR PRODUCING A HOLE IN A BODY, SPECIFICALLY AN INJECTION HOLE IN A FUEL INJECTOR

(75) Inventors: Wendelin Klügl, Seubersdorf (DE); Eberhard Kull, Pfaffenhofen (DE); Gerd Schmutzler, Kareth (DE)

(73) Assignee: Siemens Aktiengesellschaft, Munich (DE)

( * ) Notice: Subject to any disclaimer, the term of this patent is extended or adjusted under 35 U.S.C. 154(b) by 59 days.

(21) Appl. No.: 10/640,806

(22) Filed: Aug. 14, 2003

(65) Prior Publication Data

US 2004/0031465 A1  Feb. 19, 2004

Related U.S. Application Data

(63) Continuation of application No. PCT/DE02/00487, filed on Feb. 11, 2002.

(30) Foreign Application Priority Data

Feb. 14, 2001 (DE) ............... 101 06 809

(51) Int. Cl.
  *B23K 26/38* (2006.01)
  *B24B 5/48* (2006.01)
  *F02M 61/16* (2006.01)
(52) U.S. Cl. .............................. 219/121.71
(58) Field of Classification Search ............ 219/121.6, 219/121.7–121.72, 121.84; 123/305
See application file for complete search history.

(56) References Cited

U.S. PATENT DOCUMENTS

| | | | |
|---|---|---|---|
| 4,857,696 A | 8/1989 | Taeusch et al. | 219/121.7 |
| 5,093,548 A | 3/1992 | Schmidt-Hebbel | 219/121.71 |
| 5,159,167 A | 10/1992 | Chaikin et al. | 219/69.2 |
| 5,224,458 A * | 7/1993 | Okada et al. | 123/531 |
| 5,656,186 A * | 8/1997 | Mourou et al. | 219/121.69 |
| 5,837,964 A * | 11/1998 | Emer et al. | 219/121.71 |
| 5,870,421 A * | 2/1999 | Dahm | 372/75 |
| 5,934,571 A * | 8/1999 | Schmidt et al. | 239/533.9 |
| 6,070,813 A | 6/2000 | Durheim | 239/533.2 |

(Continued)

FOREIGN PATENT DOCUMENTS

DE   197 40 997 A1   3/1998

(Continued)

OTHER PUBLICATIONS

"Diesel Nozzle—the Determining Interface Between Injection system and Combustion Chamber"; D. Potz, W. Christ and B. Dittus; pp. 249-258, 2000.

(Continued)

*Primary Examiner*—Samuel M. Heinrich
(74) *Attorney, Agent, or Firm*—Baker Botts L.L.P.

(57) ABSTRACT

A method for producing a hole in a body, especially an injection hole in a fuel injector is disclosed. The hole (L) is first produced by a percussion boring process or a trepanation boring process using a laser. The percussion boring process lasts less than 3 seconds. The trepanation boring process lasts less than 10 seconds. After percussion boring or trepanation boring a smoothing step is carried out by forcing a medium that is mixed with abrasive particles under pressure through the hole until any roughnesses of surfaces (F) of the body that form the hole (L) are substantially removed.

9 Claims, 1 Drawing Sheet

U.S. PATENT DOCUMENTS

| | | | |
|---|---|---|---|
| 6,365,871 | B1 | 4/2002 | Knowles et al. ......... 219/121.7 |
| 6,624,382 | B2 * | 9/2003 | Kling ..................... 219/121.67 |
| 6,642,476 | B2 * | 11/2003 | Hamann .................. 219/121.7 |
| 6,642,477 | B1 * | 11/2003 | Patel et al. ............ 219/121.71 |
| 6,744,944 | B2 * | 6/2004 | Matsuura et al. ............. 385/24 |
| 6,864,459 | B2 * | 3/2005 | Chang et al. .......... 219/121.71 |

FOREIGN PATENT DOCUMENTS

| | | | |
|---|---|---|---|
| DE | 198 43 895 | A1 | 3/2000 |
| DE | 199 14 719 | A1 | 10/2000 |
| DE | 19914719 | * | 10/2000 |
| DE | 199 31 890 | A1 | 1/2001 |
| JP | 06249105 | A * | 9/1994 |
| JP | 02000202666 | A * | 7/2000 |
| JP | 02000202667 | A * | 7/2000 |

OTHER PUBLICATIONS

"Drilling of Ceramics with Short-Pulsed Solid-State Lasers"; Friedrich Doausinger, Tobias Abeln, et al.; pp. 78-85, 1999.

"Neue Moglichkeiten der Verbrennungsoptimierung durch hydroerosives Runden von Einspritzdusen"; Dr.-Ing. Detlev Polz et al.; pp. 64-77.

* cited by examiner

METHOD FOR PRODUCING A HOLE IN A BODY, SPECIFICALLY AN INJECTION HOLE IN A FUEL INJECTOR

CROSS REFERENCE TO RELATED APPLICATION

This application is a continuation of copending International Application No. PCT/DE02/00487 filed Feb. 11, 2002 and claiming a priority date of Feb. 14, 2001, which designates the U.S.

TECHNICAL FIELD

The invention relates to a method for producing a hole in a body, specifically an injection hole in a fuel injector. The method is designed to be suitable for producing a hole with a diameter of less than 0.5 millimeters and a length-to-diameter ratio greater then 3.

BACKGROUND OF THE INVENTION

By way of example, in "Diesel Nozzle—The Determining Interface between Injection System and Combustion Chamber", THIESEL 2000, Thermofluidynamic Processes in Diesel Engines, pages 249 to 258, D. Potz et al. describe a method of producing an injection hole in a fuel injector wherein the hole is initially produced by an electro discharge machining (EDM) process during which part of the fuel injector is heated by spark discharge and the vaporized material is flushed away by a dielectric fluid. The size and shape of the hole are essentially defined by this process. The EDM process generally takes over 40 seconds to produce the hole with the correct geometry and a low dimensional tolerance. A rounding process (hydro-erosive grinding) is then performed in which a medium containing abrasive particles is forced through the hole.

If the rounding process is of short duration, the edges of the hole opening are rounded. This short rounding process is generally used for producing holes in order to pre-empt aging processes. If the rounding process is performed for somewhat longer, the surface roughnesses of fuel injector surfaces forming the hole are smoothed. Such surface roughnesses typically exhibit height differences of up to 3 μm. An even longer rounding process can increase the hole diameter somewhat, thereby enabling the required flow rate of fuel through the hole during operation of the fuel injector to be finely adjusted. The flow rate is the quantity of fuel flowing through the hole per unit of time at a certain temperature and at a certain pressure difference. However, if the rounding process is performed for longer still, this results in uncontrolled enlargement of the hole causing the symmetry of the hole to be destroyed. The hole then has major geometrical defects.

SUMMARY OF THE INVENTION

It has been shown that, to avoid uncontrollable enlargement of the hole, the rounding process must only be performed until such time as the radial thickness of the material removed from the fuel injector surfaces forming the hole is 5 μm. The rounding process generally lasts around 30 seconds.

The object of the invention is to specify a method for producing a hole in a body which is faster compared to the prior art.

This object is achieved by a method for producing a hole in a body wherein the hole is produced by a percussion drilling process or a trepanning process using a laser. The percussion drilling process lasts less than 3 seconds. The trepanning process lasts less than 10 seconds. After the percussion drilling or trepanning process a smoothing process is carried out by forcing a medium containing abrasive particles under pressure through the hole until unevennesses in the body surfaces forming the hole are abraded.

With a percussion drilling process, a short e.g. approximately 100 μs laser pulse is applied to the body. The percussion drilling process may exhibit a plurality of such consecutive pulses. However, only a small number, e.g. up to 10 consecutive pulses, are envisioned in order to ensure that the percussion drilling process lasts no longer than 3 s. The position of the laser beam is not varied during the process so that a hole is produced whose cross-section coincides with the focus of the laser beam.

With a trepanning process, a continuous laser beam is applied to the body. During irradiation, the body is moved relative to the laser beam. The focus of the laser beam is smaller than the cross-section of the hole produced by the trepanning process.

A hole produced by a short percussion drilling process or trepanning process has a very large dimensional tolerance, i.e. the body surfaces forming the hole exhibit unevennesses. The unevennesses in the form of indentations and bulges cause the hole diameter to vary by up to 25 μm. Because of the size of the unevennesses, the subsequent smoothing process by means of which the unevennesses are essentially removed is critical to the final shape and size of the hole. For example, the smoothing process causes the flow rate of fuel through the hole to increase by 30% or 35%, or even better 50%. The smoothing process additionally results in the edges of the hole opening being rounded off and the aging process of the body being pre-empted, thereby obviating the need for an additional rounding process after production of the hole.

The invention is based on the surprising discovery that a hole produced by percussion drilling or trepanning can undergo a smoothing process by means of which up to 30 μm of material can be removed in the radial direction without uncontrolled enlargement of the hole being caused thereby.

Because of the brief duration of the percussion drilling or trepanning process, the method can be used for producing a hole very quickly.

The duration of the smoothing process can be reduced by increasing the pressure of the medium and/or the density of the abrasive particles.

The smoothing process is performed, for example, using a pressure of between 100 and 300 bar and a viscoelastic medium, such as the abrasive made by Extrude Hone. The smoothing process lasts between 20 and 100 seconds.

Alternatively, the smoothing process is performed at a pressure of between 80 and 200 bar using a liquid, preferably high-viscosity material such as test oil. The smoothing process lasts between 40 and 90 seconds.

The percussion drilling process preferably lasts no longer than one second. The very short percussion drilling process causes a hardened layer to be formed directly beneath the body surfaces forming the hole. This layer is produced by rapid cooling of the hole-surrounding material which is only briefly heated by the laser beam, the remaining body material acting as a heatsink. The longer the percussion drilling process lasts, the more the entire body heats up and the slower the material around the hole cools down after a pulse.

The hardened layer may be between 10 and 50 μm thick. As the layer is hardened, the smoothing process can be performed over a long period and/or at high pressure and/or using a highly viscous or viscoelastic material without the hole becoming eccentric and undergoing uncontrolled enlargement. Some of the hardened layer may remain after the smoothing process.

It has been found that even with a percussion drilling process of between one and 3 seconds, a smoothing process is possible during which material in a radial thickness of 10 μm or more can be removed without the hole becoming eccentric and undergoing uncontrolled enlargement.

A fuel injector, for example, can be used as the body. The hole can be produced as an injection hole. Alternatively the hole can, for example, be produced as a fuel injector throttle.

BRIEF DESCRIPTION OF THE DRAWINGS

An exemplary embodiment of the invention will now be explained in further detail with reference to the accompanying drawings.

DETAILED DESCRIPTION OF THE PREFERRED EMBODIMENTS

In the exemplary embodiment, a fuel injector K is provided and clamped into a laser drilling machine. Using the laser drilling machine, a percussion drilling process is performed with three approximately 100 μs consecutive pulses. The percussion drilling process lasts approximately one second in all.

Figure 1:
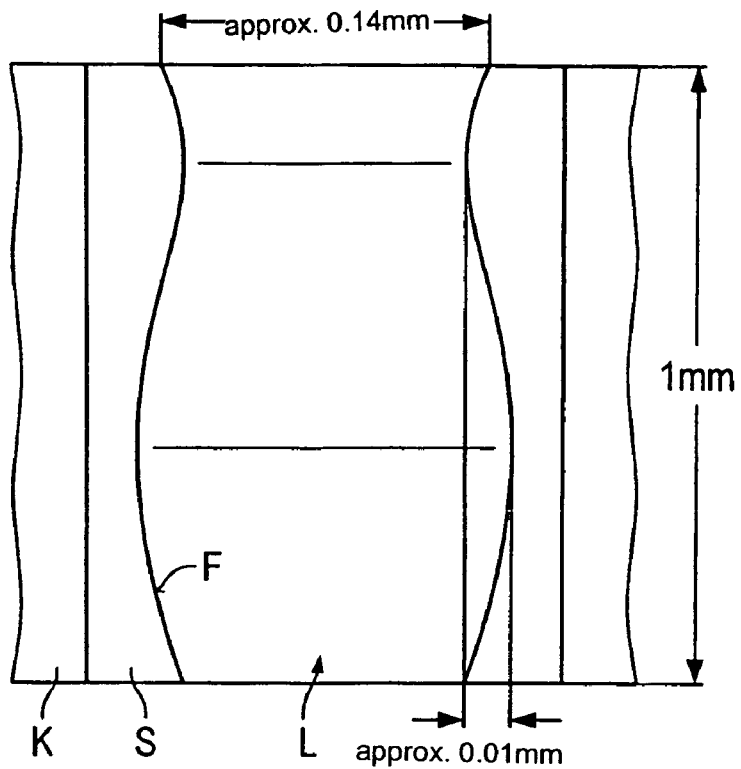
FIG. 1 shows a cross-section through a fuel injector hole having a hardened layer after a percussion drilling process has been carried out.

In the exemplary embodiment, a hole L is produced in the fuel injector K by the percussion drilling process. The hole L has unevennesses in the form of indentations and bulges with the result that the diameter of the hole L varies between 130 and 150 μm (see FIG. 1).

The percussion drilling process causes a hardened layer S approximately 20 μm thick to be formed under the surfaces F of the fuel injector K which form the hole L.

Figure 2:
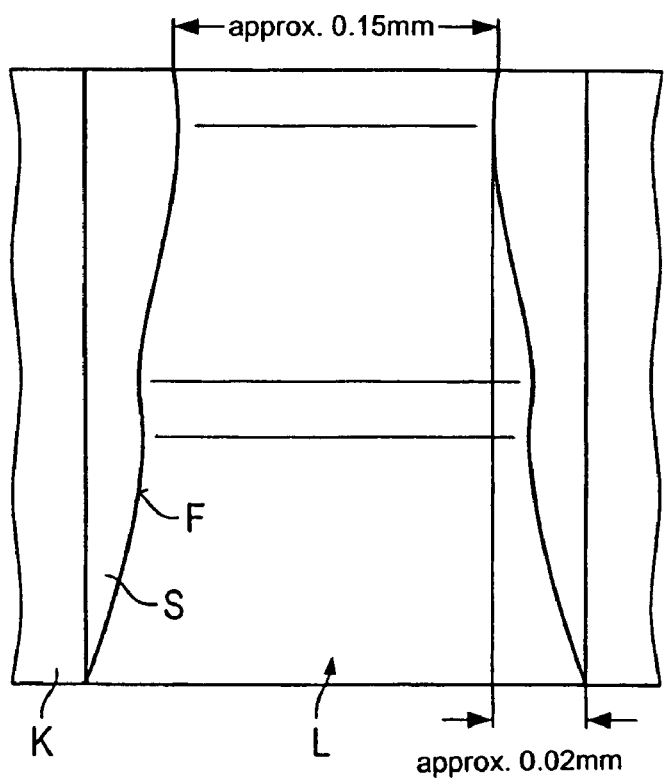
FIG. 2 shows the cross-section from FIG. 1 after a smoothing process has been carried out.

A smoothing process is then performed in which an abrasive made by the company Extrude Hone is forced through the hole L at a pressure of approximately 140 bar for approximately 70 seconds. The flow is from bottom to top. This causes the unevennesses in the surfaces of the hole L to be essentially abraded (see FIG. 2). The diameter of the hole L basically varies evenly between 150 and 170 μm. The earlier unevennesses are still detectable e.g. from the slight bulge in the center of the hole L. Part of the hardened layer S is still present even after the smoothing process.

Compared to the hole L prior to the smoothing process, the increase in the diesel flow rate at a temperature of 40° C. and a pressure difference of 100 bar is approximately 40%.

The invention claimed is:

1. A method for producing an injection hole or throttle in a fuel injector, said method consisting of:
    percussion drilling the injector at a specific surface location using a laser lasting three seconds or less to form a hardened layer of about 10 μm to about 50 μm thick directly beneath the surface location,
    performing a smoothing process by forcing a medium containing abrasive particles through the hole or throttle under pressure until a surface unevenness of the wall of the hole or throttle are removed without uncontrolled enlargement of the hole,
    wherein the smoothing process is performed at a pressure of between 100 and 300 bar using a viscoelastic medium, and
    the smoothing process lasts between 20 and 100 s.

2. A method according to claim 1, wherein the percussion drilling process lasts no longer than 1 s.

3. A method according to claim 1, wherein the smoothing process causes the fuel flow rate through the hole or throttle to increase by at least 30%.

4. A method according to claim 3, wherein the smoothing process causes material in a thickness of more than 5μm to be removed from the surfaces of the injector.

5. A method according to claim 1, wherein the smoothing process is preformed at a pressure of between 80 and 200 bar using a liquid medium, and the smoothing process lasts between 40 and 90 s.

6. A method for producing an injection hole or throttle in a fuel injector, said method consisting of:
    trepanning the injector at a specific surface location using a laser beam lasting less than ten seconds, focus of the laser beam focus being smaller than the cross-section of the hole or throttle to be produced,
    performing a smoothing process by forcing a medium containing abrasive particles through the hole under pressure until any unevenness in a wall surface of the hole or throttle is removed without uncontrolled enlargement of the hole,
    wherein the smoothing process is performed at a pressure of between 100 and 300 bar using a viscoelastic medium, and
    the smoothing process lasts between 20 and 100 s.

7. A method according to claim 6, wherein the smoothing process causes the fuel flow rate through the hole or throttle to increase by at least 30%.

8. A method according to claim 7, wherein the smoothing process causes material in a thickness of more than 5μm to be removed from the surfaces of the injector.

9. A method according to claim 6, wherein the smoothing process is performed at a pressure of between 80 and 200 bar using a liquid medium, and the smoothing process lasts between 40 and 90 s.

* * * * *